April 29, 1969     D. C. STAFFORD ETAL     3,441,262
REMOVABLE METALLURGICAL PROCESSING ASSEMBLY
Filed Sept. 21, 1966
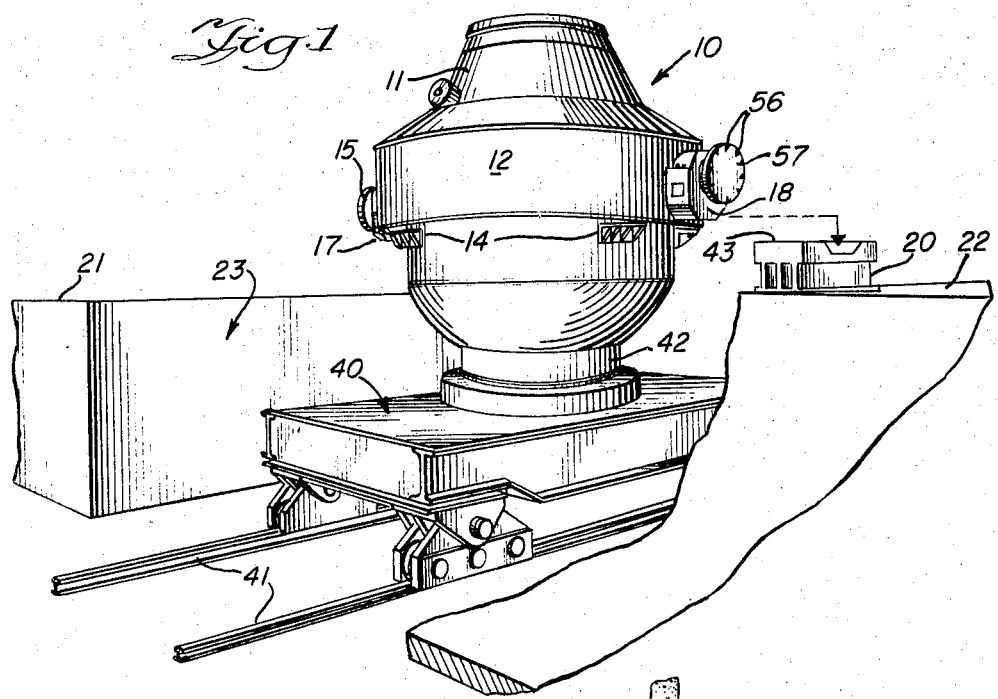
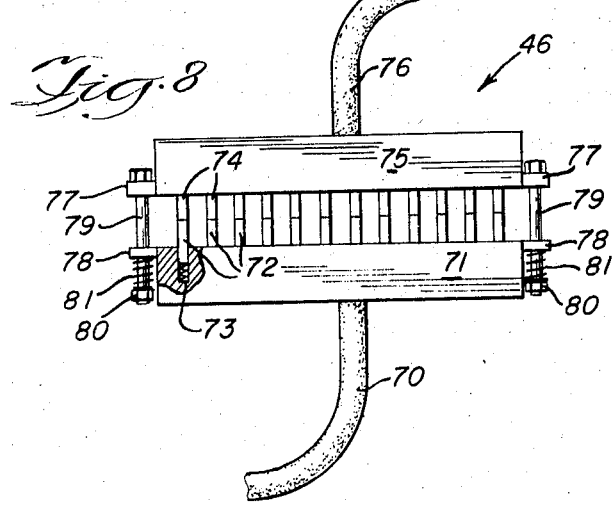
INVENTORS
Donald C. Stafford
Robert S. Chamberlin
Paul R. Johnson
By Merriam, Marshall, Shapiro & Klose
Attorneys April 29, 1969     D. C. STAFFORD ET AL     3,441,262

REMOVABLE METALLURGICAL PROCESSING ASSEMBLY

Filed Sept. 21, 1966     Sheet 2 of 3

INVENTORS
Donald C. Stafford
Robert S. Chamberlin
Paul L. Johnson
BY Merriam, Marshall, Shapiro & Kiesel
attorneys April 29, 1969  D. C. STAFFORD ET AL  3,441,262
REMOVABLE METALLURGICAL PROCESSING ASSEMBLY
Filed Sept. 21, 1966
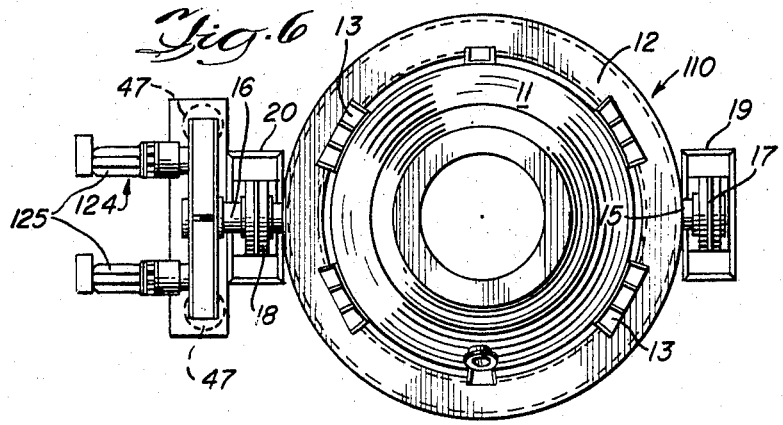
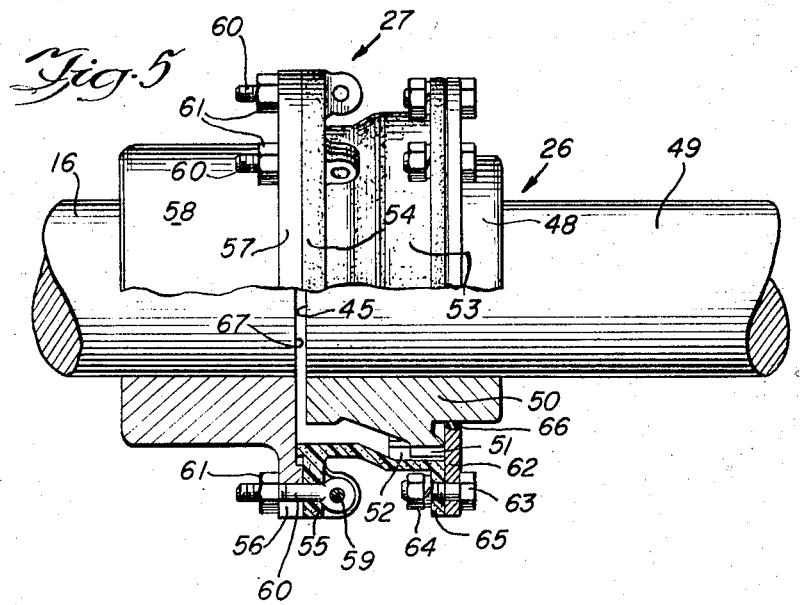
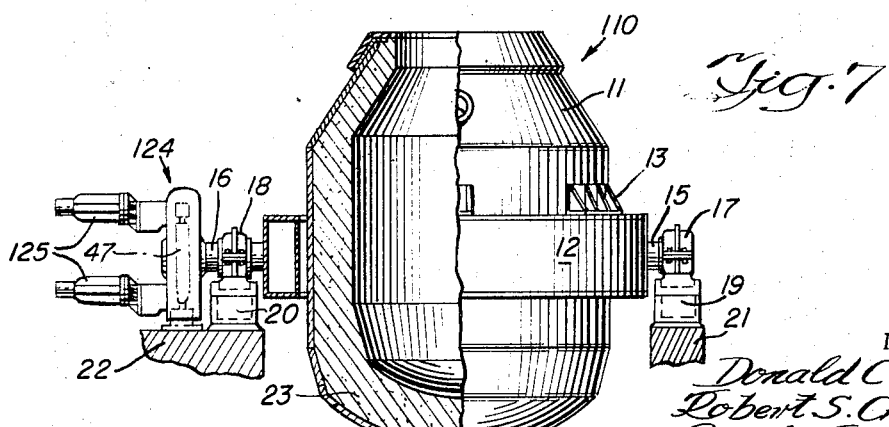
INVENTORS
Donald C. Stafford
Robert S. Chamberlin
Paul P. Johnson
By Merriam, Marshall, Shapiro & Klose
Attorneys

United States Patent Office 3,441,262
Patented Apr. 29, 1969

3,441,262
REMOVABLE METALLURGICAL PROCESSING ASSEMBLY
Donald C. Stafford, Hinsdale, Robert S. Chamberlin, Western Springs, and Paul R. Johnson, Oak Lawn, Ill., assignors to Chicago Bridge & Iron Company, Oak Brook, Ill., a corporation of Illinois
Filed Sept. 21, 1966, Ser. No. 580,922
Int. Cl. C21c 5/50; F27d 3/12
U.S. Cl. 266—36          8 Claims

ABSTRACT OF THE DISCLOSURE

Metallurigical processing assembly including rotatable vessel with trunnion pins having bearings thereon. When the assembly is in an operative position, the bearings are supported on mounting blocks with a bearing and its mounting block in unfixed relation. The vessel, trunnion pins and bearings are readily removable as a unit from the operative position by raising the unit off the mounting blocks without disassembly of the mounting blocks or of any element attached thereto.

---

The present invention relates generally to metallurigical processing apparatus and more specifically to a metallurgical processing assembly comprising a normally vertically disposed reaction vessel, means, including trunnion pins extending from the vessel and bearings on the trunnion pins, mounting the vessel for rotation about a horizontal axis, and driving means for rotating the vessel; and, as a feature, the vessel, the trunnion pins and bearings and (in one embodiment) the driving means are all readily removable, as a unit, from operative positions at which a metallurigical process can be conducted, to nonoperative positions, substantially displaced from the operative positions, and at which maintenance and repair may be performed on the assembly.

Metallurigical processing assemblies, such as an assembly including a rotatable basic oxygen converter vessel used in the making of steel, are subjected to severe operating conditions. Periodically, extensive maintenance and repair are required on components of the assembly, especially the vessel. Conducting maintenance and repair on the assembly at the location where the metallurgical processing occurs is inconvenient and is inefficient from the standpoint of idling associated equipment used with the assembly during the processing operation.

To eliminate this drawback, a metallurgical processing assembly, in accordance with the present invention, is removable, as a unit, from the processing location to another location, substantially displaced from the processing location, for the performance of maintenance and repair. While the removed assembly is undergoing maintenance and repair, another assembly can be moved into the processing location vacated by the removed assembly, this enabling the associated equipment to be fully utilized during the time the removed assembly undergoes maintenance and repair.

In one embodiment, the removable assembly may be driven by stationary driving means irremovably installed at the processing location; and, in this embodiment, the assembly includes structure which permits a rapid disconnection of the removable components thereof from the driving means, to minimize the time required for the removal operation.

In another embodiment, the driving means is removable with the assembly; and means are provided for rapidly disconnecting the driving means, which is electrically powered, from the source of electric power.

In all embodiments, structure is provided to permit the assembly to be removed from the processing location with a minimum of disconnections to free the assembly, and with all disconnecting operations being rapidly performable.

Other features and advantages are inherent in the structure claimed and disclosed or will become apparent to those skilled in the art from the following detailed description in conjunction with the accompanying diagrammatic drawings wherein:

FIGURE 1 is a perspective of an embodiment of a removable metallurgical processing assembly constructed in accordance with the present invention and showing the asembly removed from its operative position at the processing location;

FIGURE 5 is an enlarged side view, partially cut away and partially in section, illustrating a quickly disconnectable attachment between the driving means of the embodiment of FIGURES 3–4 and the rest of the assembly;

FIGURE 6 is a plan view of another embodiment of the assembly wherein the driving means is removable with the assembly;

FIGURE 7 is a side view, partially cut away and partially in section, of the embodiment of FIGURE 6; and FIGURE 8 is a plan view of a rapidly disconnectable electrical attachment between the driving means of the embodiment of FIGURES 6–7 and an electrical power source.

Figure 3:
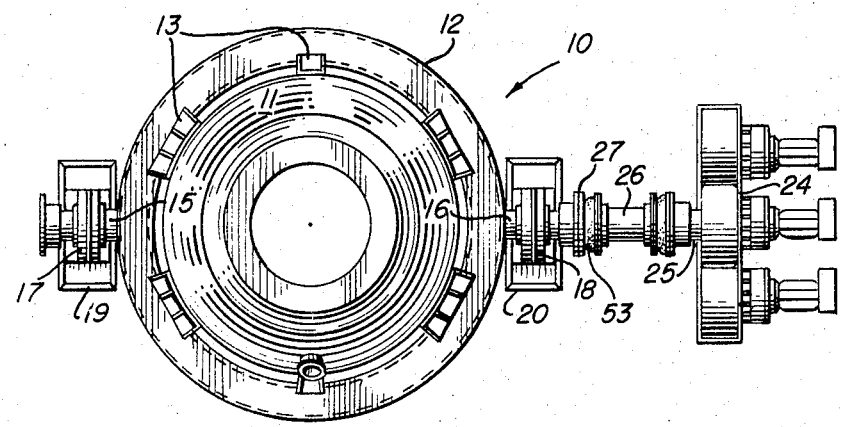
FIGURE 3 is a plan view of an embodiment of the assembly utilizing stationary driving means not removable with the assembly.

For illustration purposes, the embodiments shown in the drawings depict an assembly for making steel using the basic oxygen converter process.

Referring initially to FIGURES 1–4, there is illustrated an assembly, indicated generally at 10, comprising a conventional converter vessel 11 having a refractory lining 28 and within which a metallurgical process can be conducted. Vessel 11 is normally disposed in a vertical, upright disposition such as that shown in FIGURE 4. Disposed around vessel 11 is a trunnion ring 12 radially spaced from vessel 11. Attached to the exterior of vessel 11 are a plurality of upper brackets 13 and lower brackets 14 (FIG. 1) for supporting vessel 11 on trunnion ring 12 when the vessel is in upright and inverted vertical dispositions, respectively.

Connected to vessel 11 through fixed attachments to trunnion ring 12 are the inner ends of a pair of horizontally disposed, axially aligned trunnion pins 15, 16 each extending in diametrically opposed directions from vessel 11. Located on each trunnion pin 15, 16 is a respective bearing 17, 18 supported on a respective mounting block 19, 20 resting atop a respective foundation 21, 22 defining a pit 23 therebetween.

Mounted on foundation 22 is conventional stationary driving means 24 connected to one of the trunnion pins, e.g., 16, the drive pin, by a linkage including a drive shaft 25, a coupling 26 and readily disconnectable connecting means 27 joining drive pin 16 to coupling 26.

Driving means 24 is operable to rotate drive pin 16 causing simultaneous rotation of pin 15, trunnion ring 12 and vessel 11 about the axis of pins 15, 16. As a result, vessel 11 may be rotated between upright and inverted vertical dispositions.

Each of the mounting blocks includes means for supporting a respective bearing in an operative position on the mounting block, with the bearing and the mounting block in a mutually unfixed relation.

Figure 2:
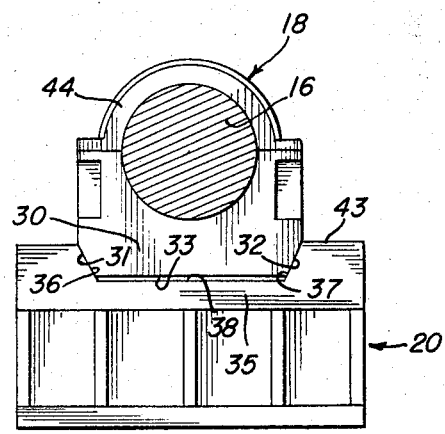
FIGURE 2 is a vertical sectional view illustrating a bearing and a mounting block for the assembly.

Referring to FIGURE 2, each of the mounting blocks, e.g., 20, has an open, upwardly facing portion 35 for receiving a lower portion 30 of a respective bearing, e.g., 18. Bearing lower portion 30 includes a pair of downwardly extending, inclined outer surfaces 31, 32, each lying in a plane parallel to the axis of trunnion pin 16. Upwardly facing portion 35 of the mounting block includes a pair of upwardly extending, inclined inner surfaces 36, 37 for engaging and confining the downwardly extending surfaces 31, 32 on a respective lower portion 30 of a bearing.

Bearing lower portion 30 also includes a horizontally disposed bottom surface 33, and mounting block upper portion 35 includes a horizontally disposed bottom surface 38.

By reason of their construction and configuration, bearing lower portion 30 and upwardly facing block portion 35 cooperate to hold the bearings against movement in a horizontal direction transverse to the axis of pin 16.

Bearings 18, 19 and upwardly facing block portions 35 cooperate to mount vessel 11, trunnion ring 12 and pins 15, 16 in operative positions to enable rotation of the vessel about the axis of pins 15, 16.

In the illustrated embodiment, each of the bearings has an upper portion 44 which is unconfined by the mounting block. The bearings 17, 18 are held in their mounting blocks 19, 20, against upward movement caused by forces arising during the processing operation, by the weight of the assembly and of the load (e.g., molten metal) within vessel 11. No clamps or other holddown structure is provided. This facilitates removal of the assembly.

Figure 4:
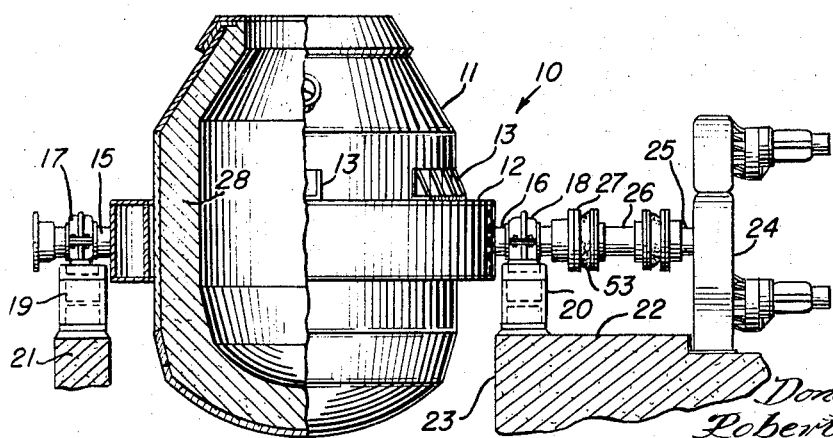
FIGURE 4 is a side view, partially cut away and partially in section, of the embodiment of FIGURE 3.

In order to remove the assembly's removable components (comprising vessel 11, trunnion ring 12, trunnion pins 15, 16 and bearings 17, 18) from the operative positions shown in FIGURES 3 and 4 to nonoperative positions, it is only necessary to disconnect the quickly disconnectable means 27. The construction of bearings 17, 18 and mounting blocks 19, 20 permits ready removal of the vessel, the pins and the bearings, as a unit, from operative to nonoperative positions merely by raising the assembly once the disconnection has been accomplished at 27. Disassembly of the upwardly facing block portions 35 is unnecessary.

The assembly may be elevated by an overhead crane or by the apparatus illustrated in FIGURE 1 and comprising a conventional railway car 40 mounted for movement on railway tracks 41 extending into pit 23. Located atop car 40 is a vertically movable pedestal 42 which engages beneath vessel 11. Pedestal 42 may be raised or lowered with a conventional hydraulic system, for example; and, upon elevation of pedestal 42, the entire assembly 10 is lifted to a position at which the bottom surface 33 on bearing lower portion 30 clears the top surface 43 of the mounting blocks (FIG. 2).

Assembly 10 is then moved to a nonoperative position, displaced substantially from the operative position of FIGURES 2 and 4. At the nonoperative position maintenance and repair on removed assembly 10 can be performed. While maintenance and repair are being performed on the removed assembly, another assembly can be moved by a car 40 into the processing location vacated by the removed assembly, lowered into mounting blocks 19, 20 and rapidly connected to driving means 24 through connecting means 27.

When maintenance and repair on removed assembly 10 are completed, it can be returned to the processing location from which it was removed or to a processing location vacated by some other assembly more recently removed for repair.

Referring to FIGURE 5, coupling 26 includes a shaft 49 having one end 45 facing the outer end 67 of trunnion pin 16 and another end drivably connected to drive shaft 25 of driving means 24. Keyed on shaft 49 is an element 50 having peripheral teeth 51 meshing with teeth 52 on the interior of a housing 53 having a flange 54 coaxial with shaft 49 and containing peripheral slots 55 aligned in matching relation with perpheral slots 56 on a flange 57 of an element 58 keyed on the outer end portion of trunnion pin 16. Flanges 57 and 54 are joined for quick disconnection by swing bolts 60 having one end pivotally mounted at 59 on flange 54, and extending through aligned peripheral slots 53, 56 on flanges 54, 57, respectively, and secured by a nut 61 tightened against flange 57 on element 58.

To rapidly disconnect pin 16 from coupling shaft 49, one need merely loosen nuts 61 and pivot swing bolts 60 out of aligned slots 56, 55. Element 50 is slidably mounted for axial movement along shaft 49; and after the uncoupling of flange 54 from flange 57, element 53 is moved slidably to the right on shaft 49, thereby effecting a complete disconnection of trunnion pin 16 from shaft 49 and driving means 24.

As element 50 is moved slidably to the right, as viewed in FIGURE 5, housing 53 moves with element 50. This is because element 50 pushes against an annular ring 62 disposed around a hub portion 48 of element 50; and annular ring 62 is connected by bolts 63 and nuts 64 to a flange 65 on housing 53. Located between the hub portion 48 and the inner periphery of annular ring 62 is a seal 66.

Referring now to the embodiment illustrated in FIGURES 6 and 7, the assembly 110 illustrated therein is essentially identical to the assembly 10 of the embodiment illustrated in FIGURES 3 and 4 with the exception that the driving means 124 of the embodiment of FIGURES 6-7, arranged about the axis of the pin, is directly mounted on and supported by an integral axial extension of trunnion pin 16 rather than being mounted on foundation 22 as is the case with the driving means 24 in the embodiment of FIGURES 3-4. Inasmuch as driving means 124 is directly mounted on shaft 16, and supported thereon, driving means 124 is removable with other components of the assembly, the removable components comprising vessel 11, trunnion ring 12, trunnion pins 15, 16, bearings 17, 18 and driving means 124, all removable as a unit.

Because of the direct mounting of driving means 124 on pin 16, no coupling or drive disconnection (such as 26 and 27 in the embodiment of FIGURES 3-4) is necessary. The only disconnection needed is the electrical coupling 46 (FIG. 8) which connects electric motors 125 of driving means 124, to a source of electricity.

Referring to FIGURE 8, electric motor 125 of driving means 124 is connected to a line 70 terminating at a block 71 mounting a plurality of pins 72 electrically connected to line 70. Pins 72 are urged by springs 73 into contact with corresponding spring-loaded pins 74 mounted on a block 75 and electrically connected to a line 76 extending from block 75 to a source of electric power. Blocks 71, 75 and their corresponding pins are urged into contacting engagement with each other by structure including ears 77, 78 on blocks 75, 71, each ear having openings (not shown) through which extend bolts 79 having a threaded end receiving nuts 80. Located between ears 78 and nuts 80 are springs 81 which urge the two blocks 71, 75 toward each other. When bolts 79 extend through the openings in flanges 77 and 78, the two blocks 71, 75 and the corresponding pins thereon are aligned for mutually engaging contact. To electrically disconnect driving means 124 from the electric power source, one need merely loosen nuts 80 and remove them from their engagement on bolts 79. Bolts 79 can also be constructed as swing bolts in the manner of bolts 60 in the connection 27 of FIGURE 5.

In some embodiments, it may be necessary to provide pin-mounted driving means 124 with conventional torque arms (dash-dot lines at 47 in FIGURE 6–7) anchored on foundation 22 and irremovable therefrom. In such an instance, the torque arms would have to be disconnected from the driving means before assembly 110 could be removed from its operative position. Quick disconnecting means, utilizing swing bolts, as described above, would be used. The torque arms each contain a resilient mechanism for resisting undesired forces due to vessel torque.

The foregoing detailed description has been given for clearness of understanding only, and no unnecessary limitations should be understood therefrom, as modifications will be obvious to those skilled in the art.

We claim:
1. In combination:
   a vessel;
   a pair of horizontally disposed, axially aligned trunnion pins each having an inner end connected to said vessel and extending in diametrically opposed directions therefrom;
   a bearing on each of said trunnion pins;
   a pair of mounting blocks each including means for supporting a respective bearing in an operative position on the mounting block, with the bearing and the mounting block in a mutually unfixed relation;
   said bearings and said mounting blocks including means cooperating to mount the vessel and the pins in an operative position for rotation of the vessel about the axis of said pins;
   said bearings and said mounting blocks including means cooperating to hold the bearings against movement in a horizontal direction transverse to the axis of said pins;
   said bearings and said mounting blocks including means cooperating to permit removal of at least the vessel, the pins and the bearings, as a unit, from their operative positions to nonoperative positions, displaced substantially from said operative positions, by raising said unit off the mounting blocks without disassembly of the mounting blocks or of any element attached thereto.

2. A combination as recited in claim 1 and comprising:
   a trunnion ring around said vessel;
   and means mounting said vessel on said trunnion ring;
   the inner end of each trunnion pin being fixed to said trunnion ring.

3. A combination as recited in claim 1 and comprising:
   drive means;
   a shaft in axial alignment with one trunnion pin when said pin is in its operative position;
   said shaft having one end drivably connected to said driving means and another end facing the outer end of said one pin;
   and means, quickly disconnectable from the outer end of said one pin, coupling the one pin to said drive shaft.

4. A combination as recited in claim 3 wherein said quickly disconnectable means comprises:
   a flange connected to said one trunnion pin and coaxial therewith;
   another flange drivably connected to said shaft and coaxial therewith;
   and a plurality of swing bolt means for engaging said two flanges together.

5. A combination as recited in claim 1 wherein:
   one of said trunnion pins is a drive pin;
   the bearing on said drive pin includes a lower portion having a pair of opposed, inclined, downwardly converging flat surfaces;
   the mounting block for said drive pin has an upwardly facing recess with a pair of opposed, inclined, upwardly diverging flat surfaces for engaging and confining said opposed flat surfaces on the lower portion of the drive pin bearing;
   and each of said pair of flat surfaces on said drive pin bearing is in surface to surface contact with one of said pair of flat surfaces on the mounting block therefor.

6. A combination as recited in claim 5 wherein:
   said drive pin bearing has an upper portion which is unconfined while the bearing is in said operative position.

7. A combination as recited in claim 1 and comprising:
   drive means arranged about the axis of said pins and mounted on and supported by an integral, axial extension of one pin;
   said integral, axial extension of said one pin and said drive means being removable as part of said removable unit by said raising of said unit off said mounting blocks.

8. A combination as recited in claim 7 wherein said drive means is electrically powered, said combination further comprising:
   means, disconnectable from said drive means, for connecting said drive means to an electric power source.

References Cited

UNITED STATES PATENTS

| | | | |
|---|---|---|---|
| 253,046 | 1/1882 | Henderson | 266—36 |
| 879,480 | 2/1908 | Maltitz. | |
| 2,976,090 | 3/1961 | McFeaters | 266—36 X |
| 3,163,695 | 12/1964 | Bumberger | 266—36 |
| 3,195,875 | 7/1965 | Mummert | 266—36 |
| 3,311,427 | 3/1967 | Toth et al. | 263—33 X |

JAMES W. WESTHAVER, *Primary Examiner.*

U.S. Cl. X.R.

263—33